(No Model.)

H. J. CAIN.
STEADY PIN FOR WATCHES.

No. 559,512. Patented May 5, 1896.

Witnesses:
Wm. M. Hall.
A. B. Hambright.

Inventor
Henry J. Cain.
By Attorney
Wm. R. Gerhart

UNITED STATES PATENT OFFICE.

HENRY J. CAIN, OF LANCASTER, PENNSYLVANIA.

STEADY-PIN FOR WATCHES.

SPECIFICATION forming part of Letters Patent No. 559,512, dated May 5, 1896.

Application filed March 7, 1896. Serial No. 582,236. (No model.)

*To all whom it may concern:*

Be it known that I, HENRY J. CAIN, a citizen of the United States, residing at Lancaster, in the county of Lancaster and State of Pennsylvania, have invented certain Improvements in Steady-Pins, of which the following is a specification.

This invention relates to improvements in the class of steady-pins more especially designed for use in watch and clock work; and the object of the invention is to combine the steady-pins with the screws securing the parts connected by said pins. Heretofore the steady-pins have been made solid, and they and the screws uniting the parts have had different locations on said parts, so that where the surfaces were greatly limited in extent it was difficult or impossible to locate the steady-pins and screws in proper relation to each other or so as to properly unite the parts.

My invention overcomes these objections; and it consists in the construction and combination of the various parts, as hereinafter fully described, and then pointed out in the claims.

Figure 1:
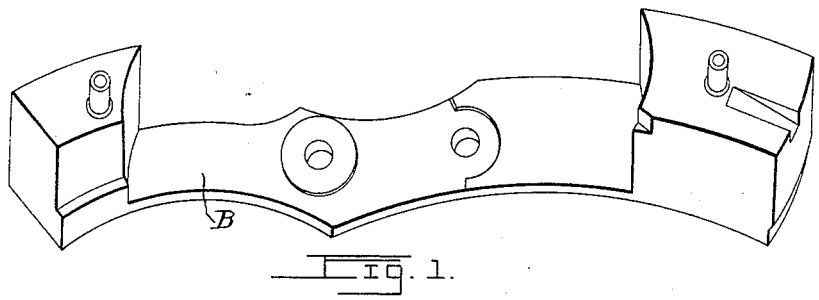
Figures 2, 3:
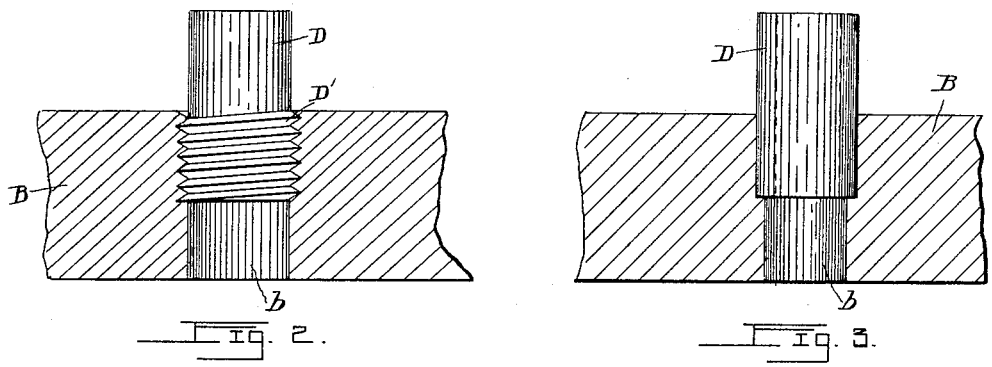

In the accompanying drawings, forming a part of this specification, Figure 1 is a bottom perspective view of a bridge-plate having steady-pins embodying the invention; Fig. 2, a sectional view of an inverted portion of a bridge-plate, showing the manner in which the steady-pins are preferably secured in place; Fig. 3, a similar view showing a modification in the manner of securing the steady-pins in place, and Fig. 4 a sectional view of two plates united by a steady-pin and a screw.

Similar letters indicate like parts throughout the several views.

Figure 4:
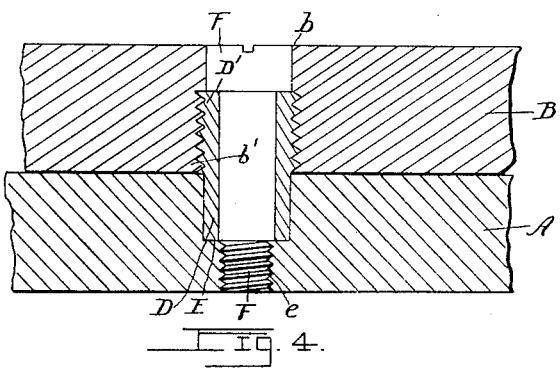

Referring to the details of the drawings, A indicates the pillar-plate; B, the bridge-plate, and *b* the screw-holes in the bridge-plate. The lower ends *b'* of the screw-holes of the bridge-plate are threaded, and into these threaded portions are screwed the threaded ends D' of tubular steady-pins, the ends D of which project beyond the face of the bridge-plate and are adapted to engage the enlarged contiguous ends of the screw-holes E of pillar-plate A. The lower ends of screw-holes E are threaded, as shown at *e*, to engage the lower ends of screws F. When the two plates are united, as shown in Fig. 4, the ends D of the steady-pins are inserted in the enlarged ends of screw-holes E, and then screws F are passed through said steady-pins and the lower ends thereof engaged with the threaded ends *e* of said screw-holes E. In this manner the steady-pins and the screws act at the same points and can both be used in less space than when they are separated. If preferable, the thread on the steady-pin may be omitted and the same be secured in the hole it engages by tapping or in any other suitable manner. So, too, the hole in the pillar-plate may be of uniform diameter throughout its length and have a threaded nut set in its lower end. It is readily seen that the position of the steady-pins can be reversed, the screw-holes in the two plates being constructed to conform therewith.

I do not restrict myself to the details of construction herein shown and described, as it is obvious that many changes may be made therein without departing from the spirit and scope of my invention.

Having thus described my invention, what I claim as new, and desire to secure by Letters Patent, is—

1. The combination, with two plates having oppositely-located screw-holes, of a tubular steady-pin secured in the screw-hole of one of said plates and having the projecting end thereof adapted to engage the screw-hole in the other plate, and a screw passing through the steady-pin and interlocking with a thread in the screw-hole engaged by the steady-pin, for the purpose specified.

2. The combination, with two plates having oppositely-located screw-holes, of a tubular steady-pin screwed in the hole of one of said plates and having the projecting end thereof adapted to engage the hole in the other plate, and a screw passing through the steady-pin and interlocking with a thread in the hole engaged by the steady-pin, substantially as and for the purpose specified.

HENRY J. CAIN.

Witnesses:
JACOB HALBACH,
WM. R. GERHART.